United States Patent [19]

Wallmander

[11] Patent Number: 4,700,306
[45] Date of Patent: Oct. 13, 1987

[54] SYSTEM FOR THE VISUALIZATION OF THE MOVEMENTS OF MARINE VESSELS BY TELEVISION DISPLAY

[75] Inventor: Bo R. Wallmander, Kungalv, Sweden

[73] Assignee: Kungalvsgruppen Areng, Hjerpe, Wallmander AB, Kungalv, Sweden

[21] Appl. No.: 739,682

[22] Filed: May 31, 1985

Related U.S. Application Data

[63] Continuation-in-part of Ser. No. 389,067, Jun. 16, 1982, abandoned.

[30] Foreign Application Priority Data

Jun. 24, 1981 [SE] Sweden .................................. 8103948

[51] Int. Cl.$^4$ .............................................. G01S 7/06
[52] U.S. Cl. ...................................... 364/449; 358/103; 342/463
[58] Field of Search ............... 364/443, 444, 449, 451, 364/460, 461, 521; 340/984, 988, 989, 990; 358/103, 104, 108, 109; 73/178 R; 342/450–453, 463–465

[56] References Cited

U.S. PATENT DOCUMENTS

| | | | |
|---|---|---|---|
| 3,150,372 | 9/1964 | Groth, Jr. ............................ | 343/464 |
| 3,715,758 | 2/1973 | Sender ................................. | 343/463 |
| 3,725,919 | 4/1973 | Jones et al. ......................... | 343/452 |
| 3,727,226 | 4/1973 | Bush .................................... | 343/452 |
| 3,787,844 | 1/1974 | Hastings et al. .................... | 343/451 |
| 3,995,273 | 11/1976 | Ulstad ................................. | 343/463 |
| 3,996,590 | 12/1976 | Hammack ........................... | 343/465 |
| 4,071,895 | 1/1978 | Wood et al. ........................ | 358/103 |
| 4,340,936 | 7/1982 | Mounce .............................. | 364/443 |
| 4,398,198 | 8/1983 | Dano et al. ......................... | 343/451 |
| 4,400,780 | 8/1983 | Nagao et al. ....................... | 364/449 |

Primary Examiner—Gary Chin

[57] ABSTRACT

Arrangement for visualizing the movements of marine vessels by television display. The arrangement comprises a position determination unit which is arranged to continuously provide position determinations in the form of coordinate values in a certain coordinate system for a number of vessels together with a data processing equipment which is arranged to feed the coordinate values with predetermined control signals each in the form of a television signal arranged to bring about a stylized image on a television screen of the respective floating units. The control signals are integrated in such a way with the respective coordinate values that a number of images are produced on a television screen of the vessel in positions which correspond to the mutual position between them in the system of coordinates. These images are moved on the television screen in accordance with the change in the continuously output coordinate values.

4 Claims, 7 Drawing Figures

SYSTEM FOR THE VISUALIZATION OF THE MOVEMENTS OF MARINE VESSELS BY TELEVISION DISPLAY

This application is a continuation-in-part of application Ser. No. 389,067 filed on June, 16, 1982, now abandoned.

The present invention relates to a system for visualising the movements of marine vessels by means of television display.

By use of standard television equipment it is extremely difficult to get an idea of the movements of marine vessels and their mutual positions. This is because generally it is only possible to observe the vessels from an extremely shallow angle, this applying particularly if the vessels are far from land or if a person viewing the vessels is located in a boat. Furthermore there are no clear reference points in open waters. A survey from an aircraft can give clear results if the area is not too large, but for cost reasons this is feasible only for a few cases. For this reason competitions between sailing boats or other vessels are not very spectacular. Furthermore, during sailing, the lead position may not be the best because subsequently wind and current conditions can favour the vessel 76 which in a certain location is apparently in an unfavourable position; this makes it even more difficult to obtain a clear picture.

By means of the present invention means have been provided for visualising the mutual positions and movements of marine vessels in an extremely clear and instructive manner. The aim is to employ the invention for visualisation by means of television display for teaching purposes, for control purposes, e.g. during competitions or to meet the needs of those who are interested in sailing sports.

The appended drawings show an embodiment of the invention.

Figure 1:
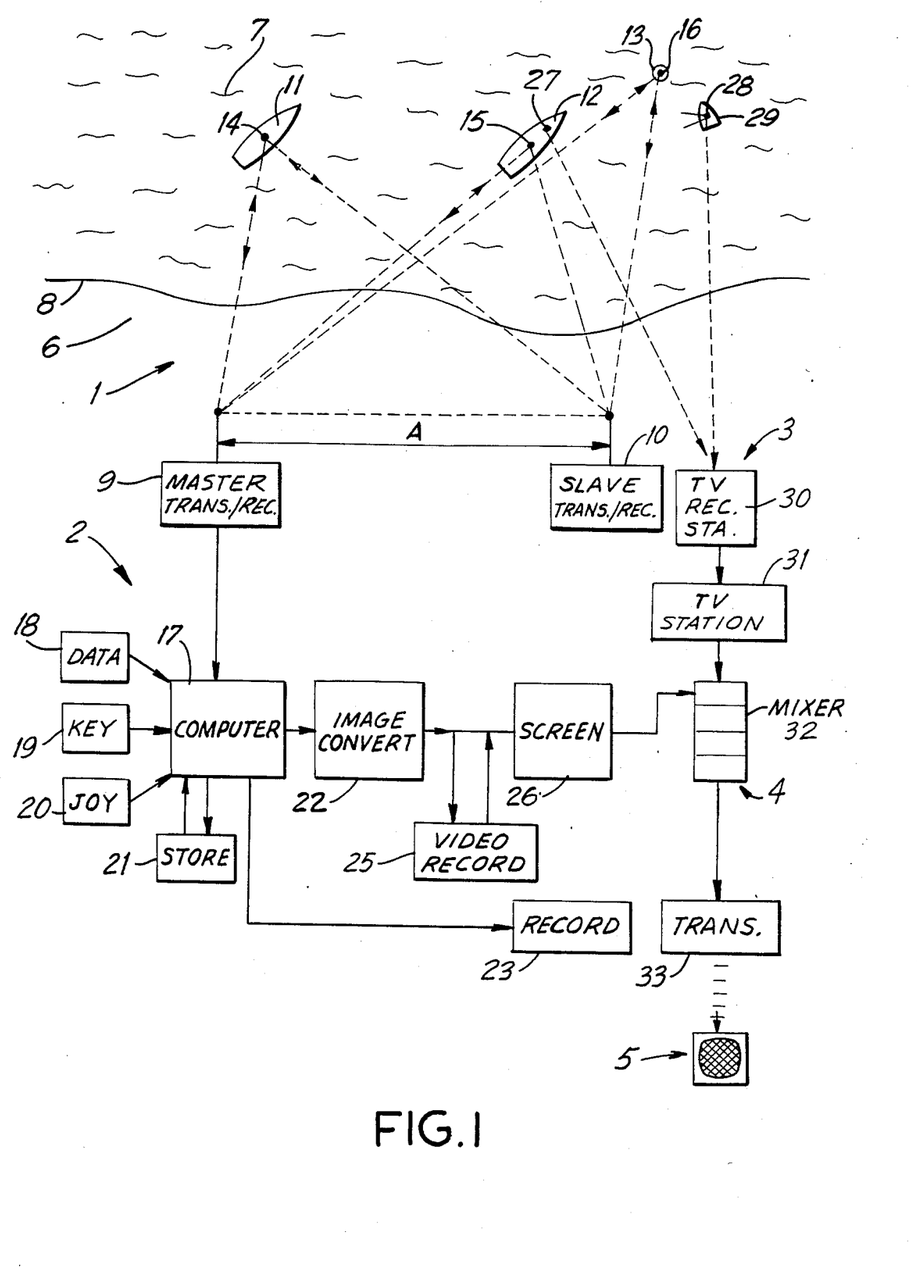
FIG. 1 illustrates a schematic diagram of the arrangement.

The system in accordance with the invention is illustrated in FIG. 1. It consists of the following main components; a position determination unit 1, equipment for the graphical or electronic presentation of measured positions in the following designated the presentation unit 2, equipment for taking one or more camera pictures in the following designated the camera unit 3, equipment for making up and transmitting a television signal in the following designated the transmission unit 4, and a number of receiver units 5 for receiving the television signals transmitted form the transmitter equipment.

The position determination unit in the following designated as the positioning system 1 consists of a number of radio transmitters and receivers. This system is according to a preferred embodiment a X-band secondary radar system and consists of a master unit, a slave unit and reply units. Some of these are located on a shore area 6 and some on a number of units floating on a water surface 7. A shore line between the water surface and the shore area is denoted by 8. The land-based units includes a master transmitter/receiver unit 9 and a slave transmitter/receiver unit 10. The floating units, which are shown, are two vessels 11 and 12 together with a buoy 13. In the follwing the vessels are designated as the boats. The slave unit is a unit that just repeats each answer it receives from a reply unit. I.e. it will transmit an answer each time it receives an answer from a reply station.

Figure 2:
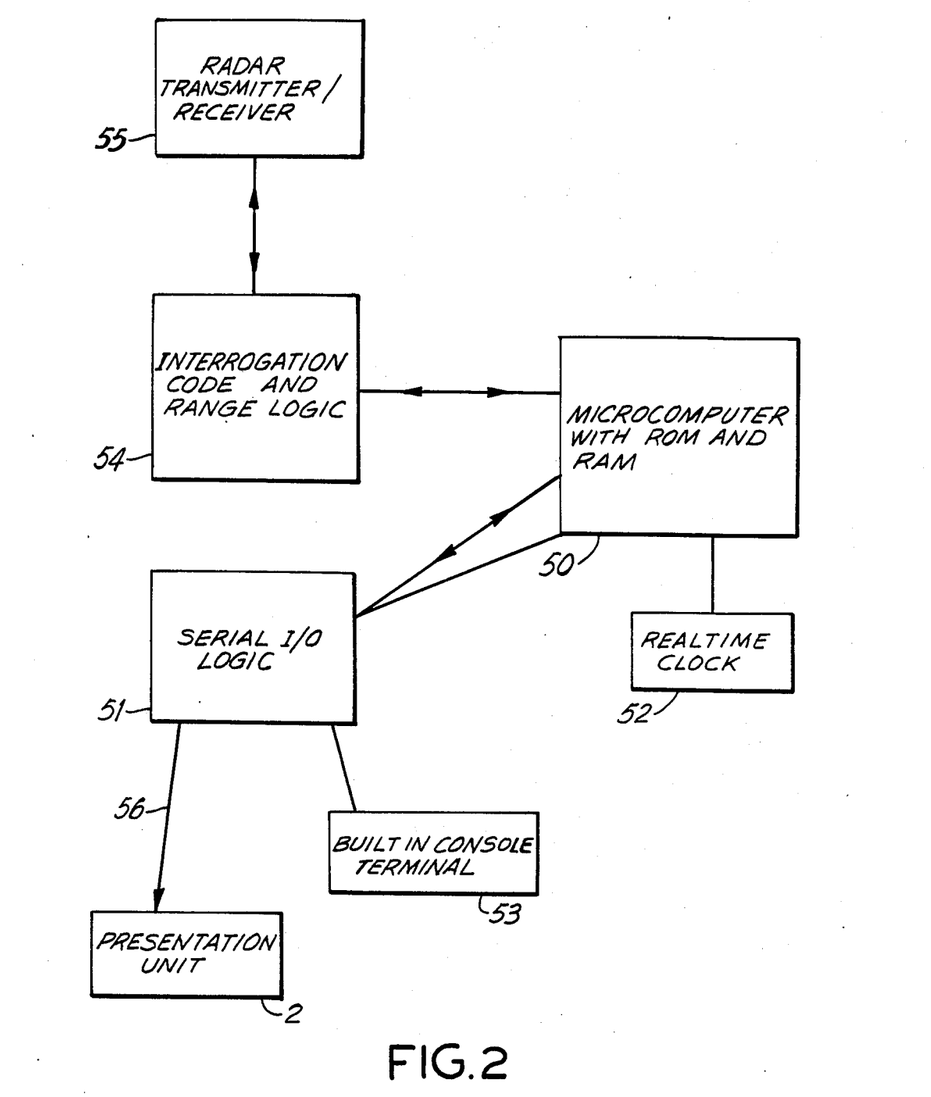
FIG. 2 shows the block structure of a master unit of the arrangement.

The master unit 9 consists of the logic blocks indicated in FIG. 2. It comprises a microcomputer 50, a general type microcomputer for example a Motorola 68008. A serial I/O is logic 51 constitutes standard serial I/O link, Motorola RS 232 and RS 422. A real-time clock 52 is used to provide the sample time interval, which is 1 second. A console terminal 53 consists of a small dedicated key board 54 and a 40 character 8 lines LCD display 55 with graphic facilities. There are also included a unit 54 provided to work with an interrogation code and a range logic and also a radar transmitter/receiver unit 55 and a connection line 56 to the presentation unit 2.

On all the floating units 11, 12, 13 there is a reply transmitter/receiver unit 14, 15 and 16 respectively. The reply unit is a selectable transponder that constitutes the secondary station in the radar system. Each of these units has a unique interrogation code and will only transmit an answer if it receives its interrogation code. The interrogation code and the answer will be described in the section that describes the master unit.

The distance designated as A between the master transmitter/receiver unit 9 and the slave transmitter/receiver unit 10 is accurately defined, this being achieved appropriately by means of an initial transmitter/reception of the same type as is employed for determination of distances, otherwise in accordance with what will be stated in the following. By this means mobile units can be set up without any special measurements, merely by sending/receiving a control value after installation.

The master transmitter/receiver unit 9 is arranged to transmit a signal of a special character which can be comprehended by the reply transmitter/receiver units. The reply transmitter/receiver units 14–16 are arranged to receive this signal and after a short accurately fixed length of time to transmit a code signal which differs for the various reply transmitter/receiver units 14, 15, 16. The receiver unit of the master transmitter/receiver 9 receives this reply signal to identify the length of time which has elapsed since the corresponding transmitter signal was emitted by the master transmitter/receiver unit 9 until its respective coded reply signals arrive. The slave transmitter/receiver unit 10 arranged to similarly arranged to receives the coded reply signals and after an accurately defined short space of time and transmits these further to the master transmitter/receiver unit 9 in such a way that the time value for transmission of the corresponding transmitter signal from the master transmitter/receiver unit until the corresponding reply signals arrive at the receiver unit of the master transmitter/receiver unit can be identified as a particular value for each reply transmitter/receiver unit in accordance with its specific code and as a value which is obtained via the slave transmitter/receiver unit.

For each transmitted signal from the master transmitter/receiver unit 10 its receiver thus again receives two signals for each slave transmitter/receiver unit, i.e. for each floating unit, on the one hand a direct coded reply signal and secondly an indirect coded reply signal which is relayed by the slave transmitter/receiver unit. The length of time between the transmitter signal and the direct reply signal corresponds to the time required by the radio waves to cover the distance from the master transmitter/receiver unit to the slave transmitter/receiver unit and back plus the period of time which can be required for the slave transmitter/receiver unit after it has received the signal to re-transmit it. The time interval for the reply signal which passes via the slave transmitter/receiver unit corresponds to the time interval required by the transmitter signal to cover the distance to the reply transmitter/receiver unit, from this to the slave transmitter/receiver unit and from the latter and back again to the master transmitter/receiver unit plus the period of time which could have been required on the part of the reply transmitter/receiver unit and the slave transmitter/receiver unit to transmit the reply signal after the incoming signal has been received. Since the distance between the master transmitter/receiver unit and the slave transmitter/receiver unit is known and hence also the period of time required for the slave transmitter/receiver signal to reach the master transmitter/receiver unit, it is possible by subtracting also to get the period of time for the reply transmitter/receiver signal to reach the slave transmitter/receiver unit. From these time values it is possible, knowing the speed of propagation of the radio waves, to this establish the distance between the respective reply transmitter/receiver unit and secondly the master transmitter/receiver unit, also the slave transmitter/receiver unit. Furthermore, as mentioned, the distance between the master transmitter/receiver unit and the slave transmitter/receiver unit is known (as mentioned above this is best determined at the outset using methods similar to those employed for determination of the previously mentioned distance). By this means all three sides of the triangle formed between each reply transmitter/receiver unit and the land-based transmitter/receiver units (see FIG. 1) are known. The various triangles formed are identified, as will be understood, by the said coded signals.

Thus the master transmitter/receiver unit can emit an output signal which indicates the length of the said triangle sides and from these values it is possible to provide the microcomputer 50 to calculate the positions in a system of coordinates of the floating units 11, 12, 13. As the master transmitter/receiver unit is designed to operate continuously, thus a flow of coordinate values is issued which successively indicates the instantaneous locations in the coordinate system of the various floating units. It should be understood here that the boats 11 and 12 move throughout the entire period whilst the buoy 13 remains anchored. The positions of the master unit 9 ($x_M$, $y_M$) and the slave unit 10 ($x_S$, $y_S$) and the interrogation code of the reply unit are to be entered to the microcomputer 50 via the built in console terminal 53. In a measurement the master unit transmits the interrogation code of the intended reply unit 14. This code consists of two short (approx. 300 ns) X-band RF pulses with the identification of the reply unit in the distance between the two pulses. Fortyeight different codes are used in practise and the distance propagation time varies from 54 microseconds to 219 microseconds. The frequency of the carrier in the pulse is denoted $f_1$. When the second pulse is transmitted, the master unit starts to record in to a RAM memory the existence of X-band RF-energy at a carrier frequency $f_2$. The frequency $f_2$ is the answer's frequency. This recording will continue for close to 1 millisecond, which corresponds to a distance greater than 100 km.

The reply unit 14 receives frequency $f_1$ and when it recognizes its interrogation code's second pulse it transmits an answer. This answer is an X-band RF pulse approximately 300 ns long with a frequency $f_2$.

The slave unit 10 receives the frequency $f_2$ and detects an answer identical with the answer described above.

When 1 millisecond has passed, the recording of the answers has stopped. The microcomputer examines the content of the RAM in the range logic and finds the two answers in the RAM. One answer is from the reply unit 14 and one answer is from the slave unit 10. The microcomputer calculates the time that has elapsed between the second pulse in the interrogation code and the corresponding answers. In the RAM the corresponding time is calculated as elapsed time $= [(\text{RAM addr.} -1) * 8 + 7 - \text{bitno}]/f_X$ where $f_X$ denotes the clock frequency (74,9237 Hz). Denote the time for the reply unit as $T_R$ and the time for the slave unit as $T_S$.

In the conversion of the two times to distances assume the following, wherein the symbol on the left is a propagation time:

$T_{TM}$ Master unit's time between logic tranmit and RF energy at the master unit's antenna.

$T_{RM}$ Time between RF energy at the antenna and logic receive for the master unit.

$T_{RM}$ The slave unit's time between logic tranmit and RF energy.

$T_{RS}$ The slave unit's time for RF energy between antenna and logic receive.

$T_{TR}$ The reply unit's time between logic tranmit and RF energy.

$T_{RR}$ The reply unit's time for RF energy between antenna and logic receive.

$T_{CS}$ The time it takes for the slave unit between logic receive and logic transmit.

$T_{CR}$ The time it takes for the reply unit between logic receive and logic transmit.

$T_{ER}$ The effective part of the time $T_R$ the RF pulses propagate for the reply unit.

$T_{ES}$ The effective part of the time $T_S$ the RF pulses propagate for the slave unit.

If these times are multiplied by the propagation velocity of light the corresponding total distances the RF pulses have propagated are obtained.

Figure 3:
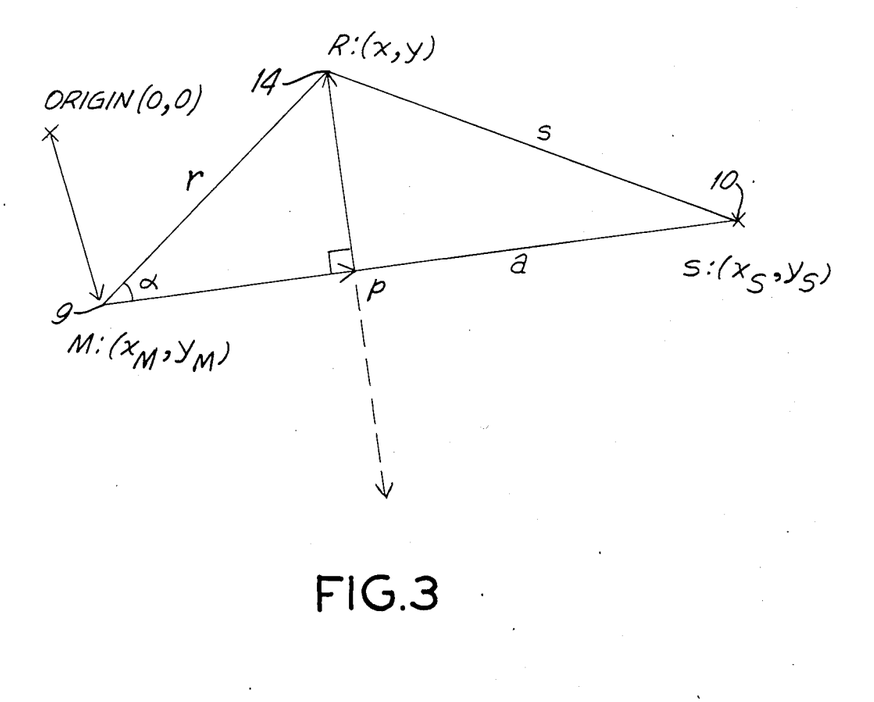
FIG. 3 shows a coordinate diagram of a position, calculation.

In order to explain how the position is obtained look at FIG. 3. The distance corresponding to $T_{ER}$ is 2r and the distance corresponding to $T_{ES}$ is r+s+a. Hence $$r = c \cdot T_{ER}/2 \qquad (3)$$

$$s = c \cdot T_{ES} - a - r \qquad (4)$$

where c is the propagation velocity of the RF pulses.

The distance a is obtained as $$a = [(x_S - x_M)^2 + (y_S - y_M)^2]^{0.5} \qquad (5)$$

With vector notation the position can be calculated by the following formula $$\overline{OR} = \overline{OM} + \overline{MP} + \overline{PR} \qquad (6)$$

The vector $\overline{OM}$ is known as $$\overline{OM} = (x_M, y_M) \quad (7)$$

The vector $\overline{MP}$ is $$\overline{MP} = (x_S - x_M, y_S - y_M) \cdot r \cos \alpha / a \quad (8)$$

where $$\cos \alpha = (a^2 + r^2 - s^2)/(2ar) \quad (9)$$

The vector $\overline{PR}$ is $$\overline{PR} = (y_M - y_S, x_S - x_M) \cdot r \sin \alpha / a \quad (10)$$

Figure 6:
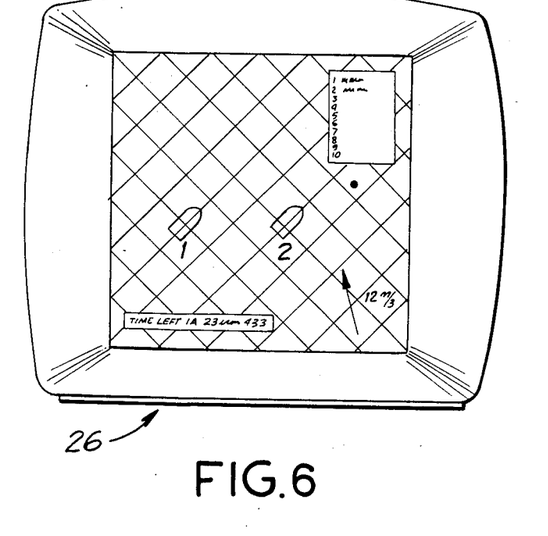
FIGS. 6, 7 show the configuration of a television picture in two different forms.
Figure 7:
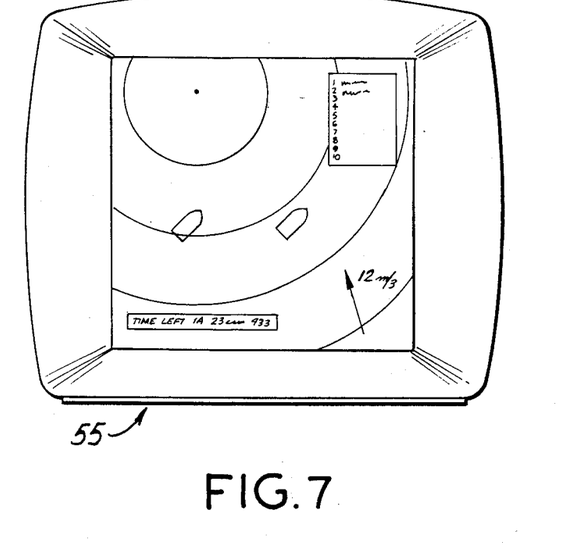

The direction of the vessel 11 is determined by calculation of the difference vector of two consecutive sampled positions. In order to avoid waves and other distrubances to give a wrong direction, the direction is filtered in an averaging filter. Denote the direction vector $\overline{D}$ as an indication at a specific sample time. The following will define the direction Now it will be described how the presentation unit 2 is working. The coordinate values are produced gradually and fed into a computer 17 in the presentation unit 2. The computer 17 is designed to receive the said coordinate-determining values and to impart to them such a shape that they can be presented as a visual signal on an image screen. This presentation must take place together with further signals for visual presentation of the actual system of coordinates and certain supplementary values, such as units for wind direction, wind strength, time factors and possible other values. Furthermore the computer is designed to give the coordinate values a directional indication for their forward movement in the system of coordinates. As shown in FIGS. 6 and 7 the various coordinate values are presented on the TV screen in the form of boat contours in the case where they relate to units capable of movement such as the boats 11 and 12. These boat contours illustrate a bow and a stern and it is obviously essential that the bow be pointed in the direction of the movement. In the case of larger boats this can be achieved by means of two reply units so. that the boat contour is made to follow the mutual location of these two units. In general however it is likely to be most practical to give the contour a location which is governed by the direction of movement of the coordinates. Hence the computer is provided by means of a suitable program to calculate this direction of movement and to provide control values for the alignment of the boat contour. In FIG. 6 a net of crossing lines are shown utilizing the determination of the relative position of the vessels and the goal. In FIG. 7 are shown corresponding lines but in the form of circles around the goal.

Further functions can also be appropriately incorporated into the computer by programming the same. Thus it may be desirable to obtain a line which shows the movement path of the individual units during a period of time backwards, also a line astern from the respective boat contours. Furthermore it may be required to manually adjust the scale on the coordinate network and different types of centering may also be required, e.g. centering to one of the sailing boats. Units for these functions have been shown by way of example in FIG. 1. Thus 18 denotes a unit for feeding in weather data such as wind direction and wind strength. Furthermore the computer must be provided with a time measuring unit and for this purpose an output signal can be present in the form of a time indication or several time indications of different types, e.g. the time which has been taken for different boats. as an example, a keyboard 19 feeds in data such as the designations of the individual boats, e.g. a numerical code, which in each case is provided at intervals in clear text in the TV image. A manual control unit 20 such as a joystick makes it possible to center the image and to change the scale as required. The computer is provided with a memory unit 21 such as a disc memory for basic data fed in e.g. from the keyboard. A further working memory stores the program.

As an example of a further ancillary unit, a recorder 23 allows incoming data to be written in. For example a list of the positions may be required for each boat at uniform intervals of time.

Data output from the computer is transmitted to an image memory 22 which ultimately converts the computer output signals to a control signal for production of a television image. This signal is transmitted on the one hand to a TV tape recorder 25 which stores the image signals produced for replay when required, possibly at a different speed.

The television signal is also transmitted to an image screen 26 where the signals which have been processed and then supplemented by the computer are given a visual shape. Thus on the image screen, on the desired scale and with the centering required, it is possible to directly observe the positions of the floating units 11, 12, 13 together with other ancillary data fed in. This picture can be controlled from the keyboard 19 and the control 20 as regards presentation of the position and ancillary data.

The camera unit 3 consists of a number of television cameras 27 and 28 which by way of example are shown placed on some of the floating units, the boat 12, and some on a special camera vessel 29. Via TV links the camera signals are transmitted to a receiver station 30 for re-transmission via a link system or cable to a television station 31. The camera images from cameras 27 and 28 are fed together with an image corresponding to the image on the image screen 26 as position presentation to a mixer unit 32. In this the various images are mixed so that a camera image can be at the rear of the position presentation. The camera images can be changed and in certain cases the position presentation can also stand on its own against a neutral background, whilst similarly some of the camera images can stand on their own. The image material selected in finally transmitted to a TV network, exemplified by a transmitter 33 for transmission to the receiver units 5. The receiver units can naturally be ordinary receiver, coded receivers for coin in the slot TV, cable receivers or some other conventional type.

Supplementing the image it is also appropriate to transmit a voice commentary. In support of this the transmitted images employed and the commentator should also have access to the unmixed position presentation on the image screen 26. The commentator or an operator in a separate department can then control the position representation with reference to the main presentation and the presentation of ancillary data.

The presentation until will now be closer described below. The unit comprises a standard video tape recorder 64 for recording of the picture of a display in a TV-monitor 65. It has also a terminal for connection to a video mixer 66.

Figure 4:
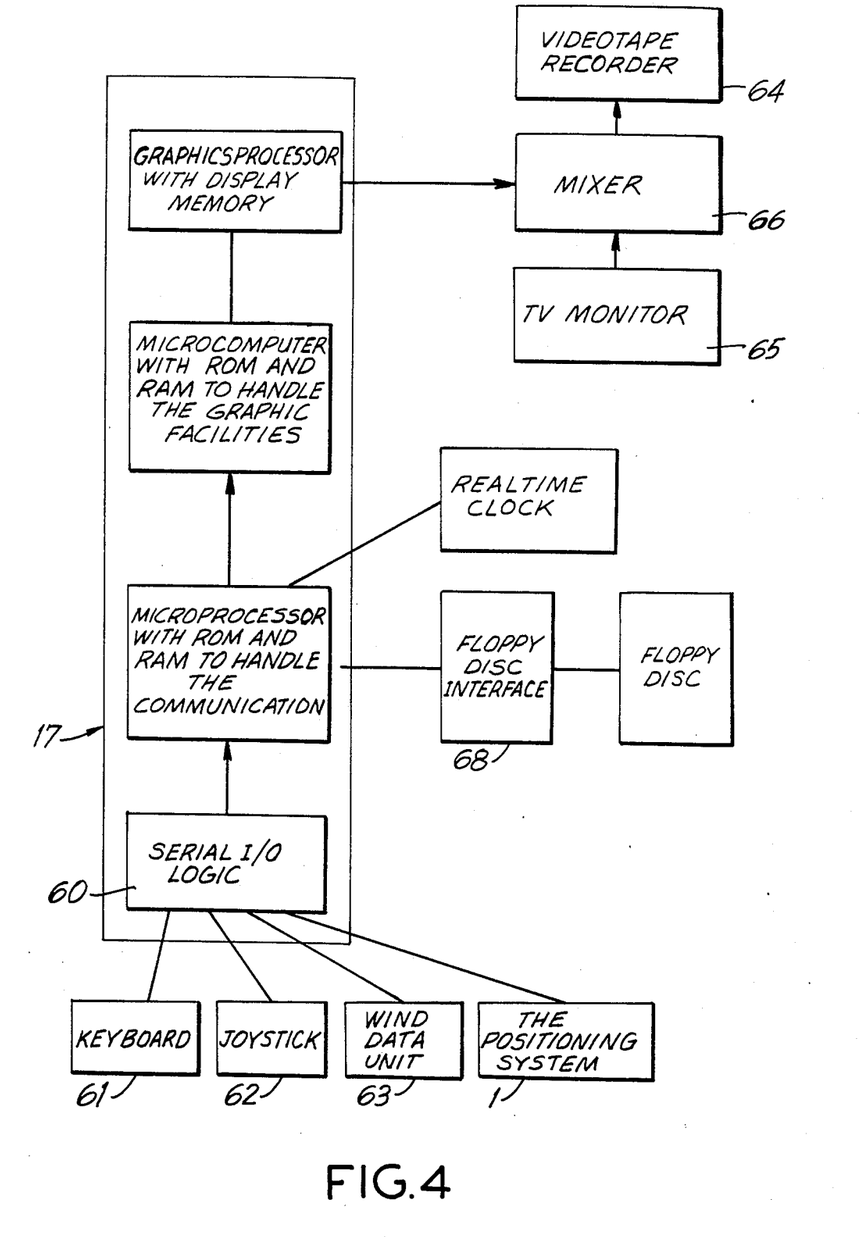
FIG. 4 shows the block structure of a television presentation unit.

FIG. 4 is a logic block description of the presentation unit. It consists of two microcomputer parts which are described separately.

The communication computer 17 is based on the processor 68008. It has also a floppy disc interface 68 and serial I/O-logic. The floppy disc drive 67 is a standard 3" disc drive. The serial I/O logic included constitutes a standard serial communication such as RS 422, RS 232 and 20 mA current loop with a keyboard 61, joystick 62, wind data unit 63 and the positioning system 1 described.

The keyboard 61 is used for entering commands to the computer. These commands can also be directed to the graphics computer. Commands to the communication computer are start of the recording of position data, end of recording, start of replay, stop of replay, replay speed, still picture, manual wind data and the real time clock set. There are also commands to handle the floppy disc formating.

The joystick 62 is only used for commands to the graphics computer and its function will be described there.

The wind data unit 63 is a commercial wind data measurement unit that measures wind force and wind direction and transmits it via a serial link to the computer.

The positioning system supplies the computer with data of the vessels' position and direction. It also supplies the computer with positions of the buoys if they are equipped with a reply a unit of the positioning system. Those data are sent to the graphic computer or eventually recorded on the floppy.

The floppy disc is used as a storage for the race. All position and wind data during the race can be saved on this media. The race can, by entering commands from the keyboard, be replayed with an accelerated rate from any point of time during the race. There exists a facility to show a still picture of a situation at a specific time.

The graphic computer receives data and commands from the computer. The data are vessel positions and direction, buoy positions (if a reply unit is present) and wind data. It receives even specific information that is to be displayed. Such information can be of any type in clear text. All these data are used for making an artificial display picture as indicated in FIG. 2. The graphic computer has internally a model of the race track, that is a coordinate system that covers an area of 65 km $\times$ 65 km.

In this coordinate system all objects of interest (vessels, buoys and start/finish lines) are assigned to their positions on the track. The joystick is used for selecting the part of the track to be displayed. The enlargement of the part is entered as a command from the keyboard. In the display are even distance circles marked in order to give an idea about the distance between the boats and buoys. Those circles are centered around a boat or a buoy. The center object is selected via the joystick and keyboard. In the bottom of the picture is space for text information entered from the keyboard. At the top of the picture is space for a sponsor's name and time.

The display picture is performed with a graphic video generator. This video generator is based on the circuit NEC 7220. The output from this generator is a standard RGB video signal.

The TV monitor and the video tape recorder can be of standard commercial types.

Figure 5:
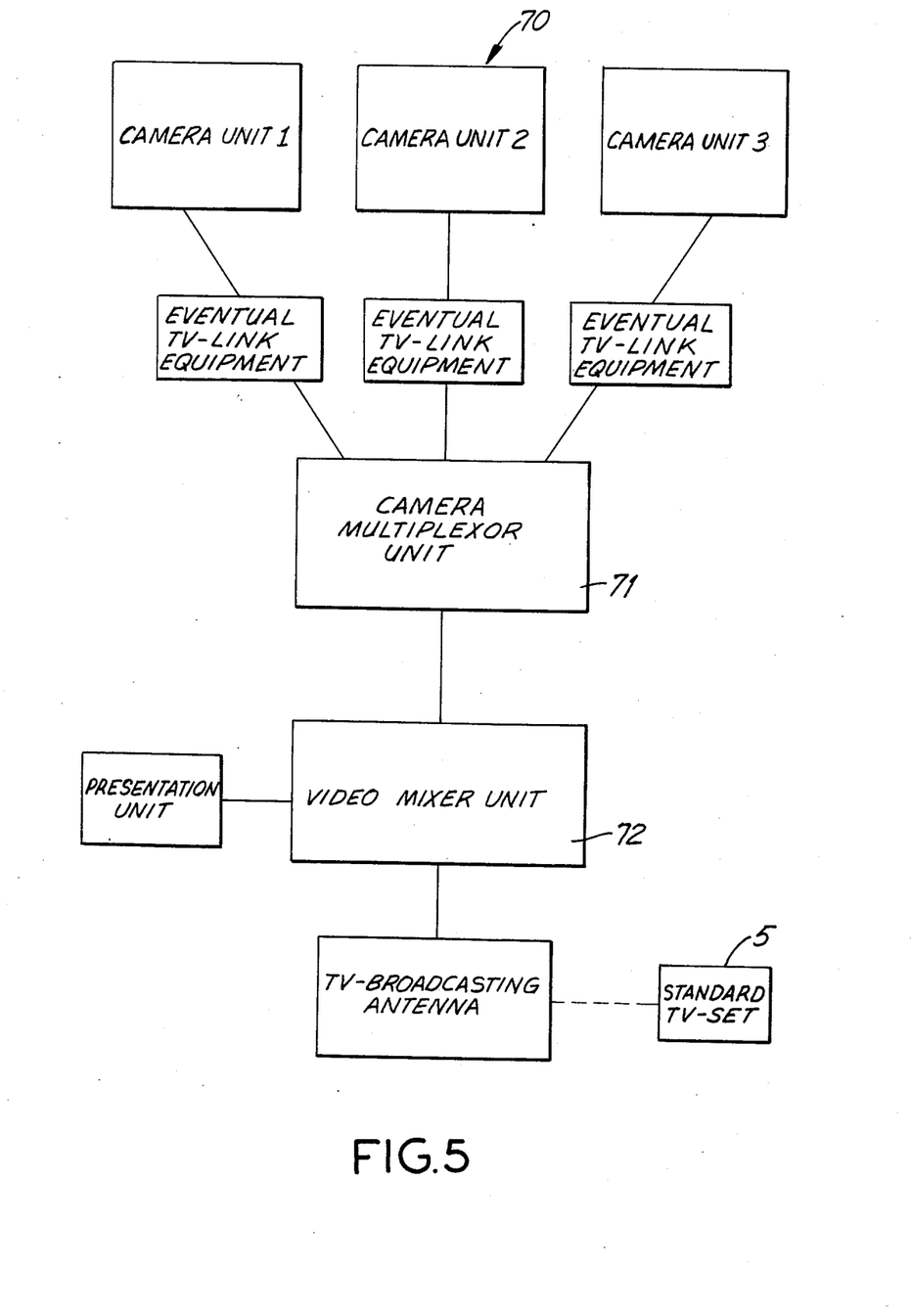
FIG. 5 shows the block structure of a broadcasing unit.

The broadcasting unit will now be described more in detail with reference made to FIG. 5 in which new reference numerals are used. The broadcasting unit consists of standard equipment used for broadcasting. FIG. 5 illustrates schematically the equipment in the broadcasting unit. This unit constitutes the mixing of pictures of the natural pictures with boats and the sea with the camera picture of the race that is supplied by the presentation unit.

The camera units 70 are standard TV cameras eventually equipped with equipment for sound recording. These cameras are used for recording of the natural picture and sound. They could be positioned at different places on a boat, on the shore, in a helicopter or in a studio for example. Several camera units can be connected to a camera multiplexor eventually via a TV link equipment.

The camera multiplexor unit 71 is used for selecting which camera picture and which sound are going to be transferred to the video mixer unit.

In the video mixer unit 72 there is a facility to mix natural pictures and sound with the artificial picture that is a model of the real race with the boats and buoys indicated with correct scale factors. This unit allows for the presentation of a good overview of the race via the artificial picture. This overview is very hard to achieve with only natural camera pictures due to the geometrical problem to always have the camera in a good position. This mixed TV picture is then transferred to the broadcasting antenna and received in standard TV-sets all over the world.

The final result is extremely clear as regards to the movement and various positions of the boats at different moments. At the same time, thanks to the camera image, a living picture can be given of conditions at sea. A camera picture on its own gives an extremely poor overview as regards to the actual movements and positions of the boats, whilst position presentation of the type described here gives a very clear picture. First of all the double presentation of positions and of a direct camera image is valuable during competitions, being shown not only with a pure aim of imparting information but also with the aim of entertainment. However, the result achieved by means of the system can be used also under other circumstances, e.g. in conjunction with complicated work at sea or marine operations.

Hence the invention is characterised by the fact that it utilizes a system by means of which two fixed stations can record the position of a plurality of moveable units, a computer being provided to give a single, which can be shown as a television picture, of their positions and simultaneously to add directional information for movement and certain ancillary data. Furthermore the image signals concerning the position presentation are supplemented by a direct camera signal to create the complete television picture. A special type of equipment has been proposed in order to obtain position information. It should be added that the presentation can be made in color, e.g. different colors for the different floating units.

What is claimed is:

1. A system for display of television images of a set of objects, viewed at oblique angle, at true relative positions, in accordance with a plan view, comprising:
    locating means including a set of baseline transceivers disposed at stationary sites and further transceivers disposed on said objects for providing plan position coordinates of each of said objects, said baseline transceivers sending ranging signals to and receiving ranging signals from said further transceivers, wherein time delays appearing in the propagation of the ranging signals introduce ranging data, said locating means including computer means for triangulation with ranging signals transmitted between the baseline transceivers and respective ones of said objects for obtaining the position coordinates of said objects;

camera means disposed at various sites for viewing the sides of said objects and for providing television-type images of said objects;

screen means coupled to said locating means for presenting an array of data points corresponding to respective ones of said objects, each of said data points being located at positions corresponding to the plan position coordinates of said objects; and mixer means coupled to said camera means and to said screen means for selectively combining portions of said television-type images with said array of data points, thereby to enable display of a composite presentation of images of said objects located in accordance with their true relative positions.

2. A system according to claim 1, wherein said objects are moving vessels, said computer means provides direction of movement of respective ones of said vessels, said screen presents a symbol at each of said data points designating the direction of a movement, and wherein said mixer means permits presentation of said television-type images with each of said symbols.

3. A system according to claim 2, wherein said objects float on the surface of a body of water, and said camera means view said objects in approximately horizontal directions.

4. A system according to claim 3, wherein said baseline is disposed along a shore of said body of water and said camera means includes television cameras carried on both stationary and moving ones of said objects.

* * * * *